Jan. 30, 1968 J. A. FRIDLEY 3,366,276
LIQUID DISPENSING APPARATUS
Filed June 16, 1966
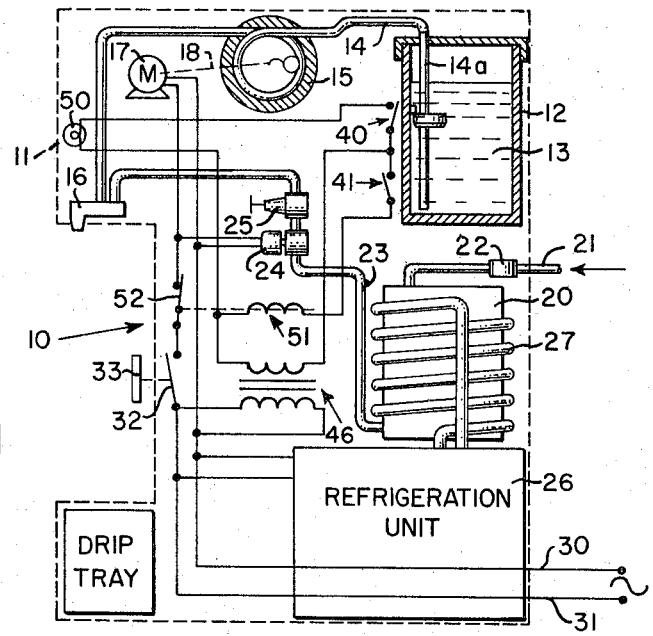
Fig. 1
Fig. 2
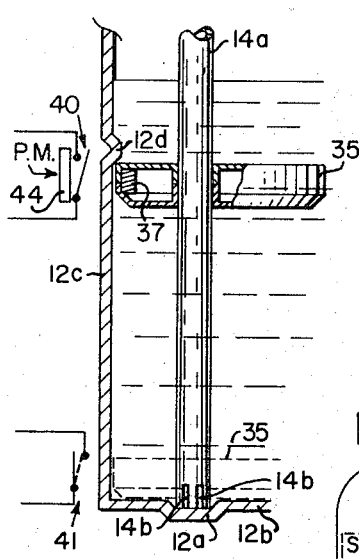
Fig. 3
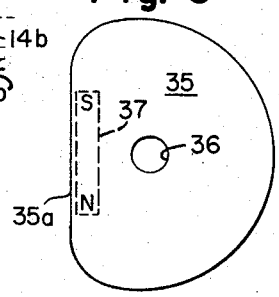
Fig. 4
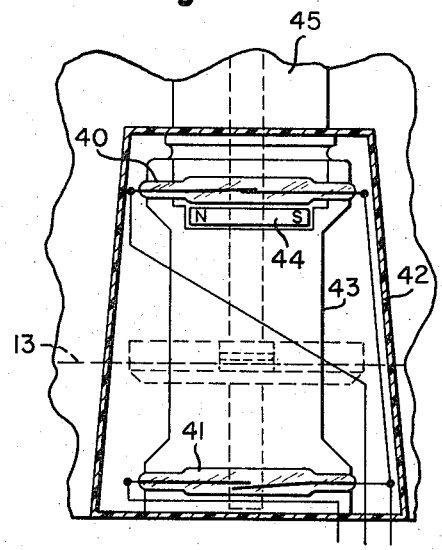
INVENTOR.
JAMES A. FRIDLEY
BY *Donald R. Jostrom*
ATTORNEY 3,366,276
LIQUID DISPENSING APPARATUS
James A. Fridley, Des Plaines, Ill., assignor to Honeywell Inc., Minneapolis, Minn., a corporation of Delaware
Filed June 16, 1966, Ser. No. 558,006
8 Claims. (Cl. 222—51)

ABSTRACT OF THE DISCLOSURE

A liquid dispenser having apparatus for indicating the level of liquid in a storage container and including a permanent magnet carried by a float which is disposed in the container and guided by a dip tube connected to the dispenser pump and extending substantially vertically in the container, and a pair of cooperating switches disposed outside the container and operable by the permanent magnet, the first of the switches being operated to give an indication when the level in the container drops to a predetermined level and the other being operated to render the dispenser inoperable when the liquid in the container is substantially depleted.

---

This invention relates to liquid dispensing apparatus and more specifically to an improvement therein which is particularly applicable to dispensers for beverages or the like. Specifically, the invention provides a simple means for measuring the liquid level in a container for storing liquid to be dispensed and for providing an indicating and/or control function in response to the liquid reaching certain predetrmined levels in the container.

In dispensers of the type having a storage container for fluid to be dispensed and a pump for selectively conveying fluid therefrom to an outlet, it is desirable, if not essential, to provide some means for sensing the liquid level in the container and providing some type of indication when a predetermined level is reached. This is particularly important in dispensers where the container stores a liquid concentrate which is mixed upon demand with a diluent, such as water. Should the concentrate supply be substantially depleted without any indication thereof, it is possible that the dispenser could be operated and a heavily watered mixture dispensed. Although there are a number of ways of sensing and indicating liquid level, many are rendered impractical by the requirement of simplicity and compactness and, particularly in the case of liquid food products, the necessity of easy cleaning.

My invention provides, in combination with a liquid food dispenser, a simple liquid level sensing apparatus which utilizes the known principle of a float carried permanent magnet in the liquid and a magnetically operable control device on the outside of the container, responsive to the permanent magnet. The liquid conduit means through which the pump draws liquid from the container is made to include a relatively rigid and substantially vertically extending dip-tube portion disposed in the container in close proximity to a substantially vertical wall thereof. This dip-tube portion has fluid opening means adjacent the bottom of the container for drawing liquid therefrom. Permanent magnet means is carried by float means disposed in the container and operably connected to the dip-tube portion of the liquid conduit means which acts as a guide and restrains the float means from moving laterally with respect thereto but renders it vertically movable with respect thereto as the liquid level in the container changes. The container is constructed of a substantially non-magnetic material and the permanent magnet means is disposed adjacent the inside of the substantially vertical wall thereof. On the outside of the wall is the magnetically operable control means and this control means and the permanent magnet means are so chosen that the permanent magnet means is effective to operate the control means only when positioned by the float at one or more predetermined vertical positions in the container.

Various objects and advantages of my invention will become apparent upon reading the following detailed description of a preferred embodiment thereof wherein reference is made to the drawing. In the drawing: FIGURE 1 is a schematic representation of a beverage dispenser utilizing my invention; FIGURE 2 is an enlarged fragmentary view disclosing a portion of the dispenser in cross section and disclosing schematically a portion of a control circuit associated therewith; FIGURE 3 is a plan view of a float which forms a part of my invention; and FIGURE 4 is an enlarged fragmentary view disclosing in detail a portion of the liquid level sensing apparatus of my invention.

FIGURE 1 discloses a liquid dispensing apparatus 10 having an appropriate case or housing 11. Inside the housing is a container 12 for storing a quantity of liquid concentrate 13. A liquid conduit 14 connects the interior of container 12 to a constant rate pump 15 and the output of this pump is connected to a dispensing nozzle or fluid outlet 16. Pump 15 is preferably, but not necessarily, of the compressible-tube type. A pump of this type is shown in the De Bakey Patent No. 2,018,998. This type of pump utilizes a flexible tube which is compressed by a roller which passes over it to positively displace fluid through the flexible tube. In the schematic showing of FIGURE 1 the liquid conduit 14 is shown to extend continuously through pump 15 and to serve as the flexible tube. In actual practice, conduit 14 is separate from the tube and is attached thereto by appropriate means. Pump 15 is driven by a motor 17 connected to it by appropriate means shown schematically at 18.

Also mounted within the housing is an additional container or tank 20 which is supplied with a liquid diluent such as water through an appropriate conduit 21 which may include a pressure regulator valve 22. Tank 20 is connected to the fluid outlet 16 by an appropriate fluid conduit 23 which has interposed therein a normally closed, electrically operable, on-off valve 24 and an adjustable metering valve 25. An appropriate refrigeration unit 26 may also be disposed in housing 11 with refrigerating coils 27 surrounding tank 20 which serves as a chilling tank. It will be obvious that, if desired, additional chilling coils may be provided for cooling the contents of container 12. For simplicity these coils have been omitted in the drawing. Electrical power is supplied through a pair of conductors 30 and 31 which are adapted to be connected to a conventional source of alternating power. Refrigeration unit 26 may be connected directly to these conductors through appropriate control apparatus (not shown). Interposed in conductor 31 is a manually operable switch 32 with manual actuator 33 disposed in the general area of fluid outlet 16. Motor 17 and valve 24 are electrically connected in parallel by appropriate conductors and this parallel combination is connected, through switch 32, to conductors 30 and 31. Thus, manually operable switch 32 controls simultaneous operation of valve 24 and motor 17.

The structure described thus far is not new with the applicant. Rather, his invention relates to the combination therewith of additional apparatus responsive to the level of liquid in container 12. First, the operation of the above described structure will be reviewed briefly. Motor 17 operates at a substantially constant speed when energized and thus drives pump 15 at a substantially constant speed so that concentrate is pumped from container 12 to fluid outlet 16 at a substantially constant time rate when the motor is energized. Metering valve 25 is adjusted so that the flow of diluent when valve 24 is opened is at a rate such that the desired ratio of diluent to concentrate is delivered to fluid outlet 16 when valve 24 and pump 15 are operated simultaneously. As previously noted, this occurs whenever switch 32 is closed.

In order to sense the liquid level in container 12, I provide liquid conduit 14 with a substantially vertically extending, relatively rigid portion 14a in container 12 and extending from top to bottom thereof. As best seen in FIGURE 2, portion 14a, which serves as a dip-tube, extends into a recess or well 12a formed in bottom 12b of container 12. Adjacent its lower end, dip-tube portion 14a is provided with a plurality of longitudinally extending slots 14b through which liquid concentrate is drawn when the pump is operated. Dip-tube portion 14a acts as a guide for a float 35 which has an aperture 36 formed therein and through which dip-tube portion 14a extends. Float 35 may be provided with a relatively flat surface 35a which is disposed adjacent the inside of a vertical wall 12c of container 12. Disposed inside of float 35 and generally adjacent edge 35a thereof, is a permanent magnet 37. Preferably, float 35 is made of plastic or similar material which is easily cleaned and which is resistant to attack by the liquid 13. Also, the float may be a molded member, molded with the magnet sealed inside, or may otherwise be formed so that it is entirely sealed with a minimum of contours which will make cleaning difficult. Dip-tube portion 14a is held relatively rigidly in the container and therefore acts as a guide for the float. It precludes movement of the float laterally with respect to the dip-tube but permits it to move vertically with respect thereto, and assures that magnet 37 is in close proximity to wall 12c.

Mounted on the exterior of container 12 and in close proximity to wall 12c is magnetically operable control means responsive to a predetermined vertical position of magnet 37 in container 12. In the preferred arrangement, this control means includes two magnetically operable switches 40 and 41. Preferably switch 40 is normally closed while switch 41 is normally open. Switch 40 is disposed so that it is opened by the field of permanent magnet 37 when the float is disposed in a predetermined vertical position between the top and bottom of container 12. Preferably this position is chosen to correspond to a liquid wherein a predetermined quantity of the liquid can be added to container 12. In a production model of the dispenser, which is especially designed for dispensing concentrated fruit juices, switch 40 is positioned so that it responds to a liquid level at which one full can of concentrated fruit juice can be added to container 12. At this point an appropriate stop, such as the abutment formed by an indentation 12d in wall 12c of the container, is provided so that the float can rise no higher in the container even if the liquid level rises. Thus, float 35 and magnet 37 are disposed at this position whenever the liquid level is at or above this predetermined level.

Preferably, switch 41 is disposed adjacent the bottom of wall 12c of the container so that the switch is closed by magnet 37 only when the float is substantially at the bottom of the container, thus corresponding to a situation wherein the liquid supply in container 12 is substantially depleted.

In the preferred form, switches 40 and 41 are reed switches, a type of switch which is well known and the particular construction of which forms no part of this invention. Briefly stated, the reed switches each have a pair of blades normally biased apart and sealed within a glass tube. When a permanent magnet is brought into close proximity with the tube, the magnetic flux path is through the two blades and causes them to be attracted to each other to close the circuit. A normally closed switch can be provided by having a magnet permanently fixed adjacent the tube and thus causing the blades to contact each other. When an oppositely polarized magnet is brought into close proximity, it counteracts the effect of the first magnet and allows the blades to open.

FIGURE 4 discloses a structure used for mounting switches 40 and 41 in the preferred embodiment. A generally trapezoidally shaped plastic housing 42 has supported therein a plastic strip 43 on which the two switches are permanently mounted by appropriate means not shown. Adjacent switch 40 is permanently mounted a permanent magnet 44 and this magnet induces a magnetic flux path through the blades of switch 40 causing them to close. Once reed switches 40 and 41, magnet 44 and the appropriate conductors are mounted within housing 42, an appropriate cover (not shown) is attached to seal the entire unit. This may be mounted in the dispenser by any appropriate means such as by suspending it by an upwardly extending support member 45, only a portion of which is shown in FIGURE 4.

Preferably, reed switches 40 and 41 are low voltage switches and therefore a transformer 46 is connected across conductors 30 and 31 in a position so as not to be affected by the position of switch 32. Switch 40 has connected in series therewith an appropriate indicating means such as a lamp 50 and switch 41 has connected in series therewith an electromagnetic relay 51 which has a normally closed switch 52 connected in series with switch 32 and therefore in overriding controlling relationship with valve 24 and motor 17. This switch is considered to be in "overriding controlling relationship" with these elements since it is able to render the system inoperative regardless of the position of switch 32. These two series circuits are connected in parallel across the low voltage side of transformer 46.

Because of permanent magnet 44, switch 40 is normally closed and completes a circuit to lamp 50. However, whenever the liquid level in container 12 is at or above the predetermined level at which float 37 abuts stop 12d, permanent magnet 37 counteracts the effect of magnet 44 and causes switch 40 to open and thus to break the circuit to lamp 50. Whenever the liquid level drops below this predetermined level, lamp 50 is energized, giving an indication that a predetermined amount of liquid can be added to the container.

Since switch 41 is normally open, relay 51 is normally de-energized and its switch or set of contacts 52 is normally closed. However, when the liquid level drops to a position wherein magnet 37 is moved to the bottom of the container (as shown in dashed lines in FIGURE 2) magnet 37 will cause switch 41 to close. This completes a circuit to relay 51 which opens the contacts 52, breaking the circuit to motor 17 and valve 24 and thereby rendering them inoperative regardless of the position of switch 32. FIGURE 4 discloses the switches in the conditions which they have when the float (shown in dashed lines) is at a position intermediate the two switches. At this time switch 40 is closed and light 50 is energized indicating that a predetermined amount of liquid can be added but switch 41 is open so that the dispenser is still operable in response to the closing of switch 32. Preferably switch 41 is so disposed that it is not closed by magnet 37 until the level in the container has been substantially depleted or at least has dropped to a level where there is a likelihood that insufficient concentrate will be drawn through conduit 14 upon operation of pump 15 to provide the desired mixture at outlet 16.

From the foregoing it can be seen that my invention provides a relatively simple, but very effective, liquid level sensing and indicating and/or control apparatus for a liquid dispenser. This is accomplished without the addition of complex apparatus, particularly inside the container for the liquid, but rather utilizes components already essential to the operation of the device, such as the dip-tube portion of the fluid conduit, to provide additional functions as a part of the level sensing apparatus. The use of the dip-tube portion as a float guide assures that the float is properly positioned when in use but renders it easily removed for cleaning when necessary. Further it avoids the necessity of providing an additional guide in the container and thereby adding to the complexity of the device and the sanitation problems inherent in food handling machines. By having the float at the dip-tube it is assured that it measures liquid level at the dip-tube. If disposed elsewhere in the container, and the dispenser or container was tipped slightly, the float could be high enough so that it would not operate switch 41 even if slots 146 were above the liquid level at the dip-tube. Thus, the pump and valve could be energized with an insufficient supply of concentrate. With the structure provided by my invention this condition cannot exist.

It will be obvious that various modifications to this preferred embodiment may be made without departing from the invention. For example, the magnetically operable control apparatus disclosed as a normally closed and a normally open reed switch may obviously be changed, as for example by substituting a normally open switch for the normally closed one disclosed and vice versa. Further, the device may include only indicating means and not a means for rendering the dispenser inoperative when the level drops to a predetermined level or it may eliminate the indicator means and simply provide means for rendering the dispenser inoperative at some predetermined level. Thus, it will be clear that the preferred embodiment has been shown and described for illustrative purposes and not by way of limitation, and that this invention is to be limited solely by the scope of the appended claims.

I claim:

1. In a liquid dispensing apparatus having a container for storing liquid to be dispensed, a dispensing outlet, liquid conduit means connecting the container and the outlet, pump means in the conduit means and operable to pump liquid therethrough from the container to the outlet, and electrical control means selectively operable to control operation of the pump means, the improvement comprising: the container being constructed of a substantially non-magnetic material and including at least one substantially vertical wall and a bottom; the liquid conduit means including a relatively rigid, substantially vertically extending, dip-tube portion disposed in the container in close proximity to said vertical wall and having fluid opening means for drawing liquid from the container upon operation of the pump means; float means disposed in the container and operably connected to said dip-tube portion so that said dip-tube portion acts as a guide and restrains said float means from moving laterally thereof but renders it movable vertically with respect thereto in response to variations in liquid level in the container; electrically energizable liquid level indicator means; circuit means for connecting said indicator means across a source of power; magnetically operable control means disposed outside of, and in close proximity to, the vertical wall of the container and including first switch means operable between first and second control conditions and connected in controlling relationship with said indicator means; permanent magnet means carried by said float means in said container in close proximity to said vertical wall and having sufficient strength to operate said magnetically operable control means only when said magnet means is positioned by said float means in at least one vertical position with respect to said magnetically operable control means; and said magnetically operable control means being so disposed that said switch means is maintained in its first control position when said permanent magnet means is disposed at or above a predetermined vertical position and said switch means is maintained in its second control condition when said permanent magnet means is disposed below said predetermined position.

2. The liquid dispensing apparatus of claim 1 wherein said predetermined vertical position at which said first switch means is operated by said permanent magnet means corresponds to a liquid level substantially above the bottom of said container and wherein said magnetically operable control means includes second switch means operable by said permanent magnet means only when said float means is in a vertical position corresponding to the liquid in said container being substantially depleted.

3. The apparatus of claim 2 wherein said second switch means is connected in overriding controlling relationship with said pump means and wherein operation of said second switch means by said permanent magnet means renders said pump means inoperative when the liquid is substantially depleted.

4. The apparatus of claim 1 wherein the first and second control conditions of said first switch means are open and closed conditions thereof, respectively, and wherein said first switch means is normally closed and is opened by said permanent magnet means at a predetermined position of said float means substantially above the bottom of said container.

5. The liquid dispensing apparatus of claim 4 wherein said first switch means is disposed so that the predetermined float position at which said first switch means is opened by said permanent magnet means is a position assumed by the float means at a predetermined liquid level which exists when the container is only partially full of liquid; wherein there is provided means preventing upward movement of said float means with respect to said dip-tube portion beyond said predetermined position so that said first switch means is maintained in open condition by said permanent magnet means when the liquid level is at or above said predetermined liquid level and is allowed to return to its normally closed condition when the liquid level is below said predetermined level.

6. The liquid dispensing apparatus of claim 5 wherein said magnetically operable control means further includes second switch means including control means connected in overriding controlling relationship with said pump means, said second switch means being operable by said permanent magnet means when the liquid level reaches substantially the bottom of said container to render said pump means inoperative.

7. The liquid dispensing apparatus of claim 6 wherein said first switch means is a normally closed reed switch opened by said permanent magnet means when it comes into close proximity therewith, and wherein said second switch means includes a normally open reed switch closed by said permanent magnet means when it comes into close proximity therewith, an electrically energizable relay having a set of normally closed contacts connected in series circuit with the electrically energizable control means for said pump means, and circuit means connecting said normally open reed switch in controlling relationship with said relay so that upon closure of said normally open reed switch, a circuit is completed to energize said relay and open its normally closed contacts.

8. The apparatus of claim 4 wherein the liquid stored in said container is a concentrate and is mixed with a liquid diluent intermediate the pump means and the outlet, the flow of diluent is controlled by an electrically operable valve, the pump means is operated by an electric motor, and the electrical control means includes circuit to said motor and valve only when said magnet source of power and switch means in said circuit means selectively operable to simultaneously close the circuit means to energize said motor and open said valve; and wherein said magnetically operable control means includes second switch means connected in overriding controlling relationship with said motor and said valve and operable by said permanent magnet means to open said circuit means for connecting said valve and motor to a means assumes a vertical position corresponding to the liquid in said container being substantially depleted.

References Cited

UNITED STATES PATENTS

| | | | |
|---|---|---|---|
| 2,339,922 | 1/1944 | Gatewood | 220—84 X |
| 2,972,434 | 2/1961 | James | 222—66 |
| 3,114,478 | 12/1963 | Hilkemeier et al. | 222—76 X |
| 3,206,069 | 9/1965 | Jacobs et al. | 222—67 X |
| 3,242,474 | 3/1966 | Gast et al. | 200—84 X |

ROBERT B. REEVES, *Primary Examiner.*

HADD S. LANE, *Examiner.*

UNITED STATES PATENT OFFICE
CERTIFICATE OF CORRECTION

Patent No. 3,366,276　　　　　　　　　　　　January 30, 1968

James A. Fridley

It is hereby certified that error appears in the above numbered patent requiring correction and that the said Letters Patent should read as corrected below.

Column 7, line 1, beginning with "circuit" cancel all to and including "to the" in line 10, same column 7, and insert -- circuit means for connecting said valve and motor to a source of power and switch means in said circuit means selectively operable to simultaneously close the circuit means to energize said motor and open said valve; and wherein said magnetically operable control means includes second switch means connected in overriding controlling relationship with said motor and said valve and operable by said permanent magnet means to open said circuit means to said motor and valve only when said magnet means assumes a vertical position corresponding to the --.

Signed and sealed this 16th day of September 1969.

(SEAL)
Attest:

EDWARD M. FLETCHER, JR.　　　　　　　WILLIAM E. SCHUYLER, JR.
Attesting Officer　　　　　　　　　　Commissioner of Patents